United States Patent
Gettemy et al.

(10) Patent No.: US 7,800,591 B2
(45) Date of Patent: Sep. 21, 2010

(54) THREE-DIMENSIONAL CONTACT-SENSITIVE FEATURE FOR ELECTRONIC DEVICES

(75) Inventors: Shawn R. Gettemy, San Jose, CA (US); Lawrence Lam, San Jose, CA (US); William R. Hanson, Mountain View, CA (US)

(73) Assignee: Palm, Inc., Sunnyvale, CA (US)

( * ) Notice: Subject to any disclaimer, the term of this patent is extended or adjusted under 35 U.S.C. 154(b) by 475 days.

(21) Appl. No.: 11/112,051

(22) Filed: Apr. 22, 2005

(65) Prior Publication Data

US 2005/0184974 A1 Aug. 25, 2005

Related U.S. Application Data

(62) Division of application No. 09/871,322, filed on May 30, 2001, now Pat. No. 6,924,752.

(51) Int. Cl.
*G09G 5/00* (2006.01)
(52) U.S. Cl. ....................... 345/173; 345/419
(58) Field of Classification Search ................. 345/156, 345/173, 158, 169, 419, 581; 178/18.01; 382/124; 439/66, 78; 356/139.03; 715/757, 715/848, 850; 348/51; 341/31, 34; 361/807, 361/810
See application file for complete search history.

(56) References Cited

U.S. PATENT DOCUMENTS

| | | | | |
|---|---|---|---|---|
| 5,386,219 A * | 1/1995 | Greanias et al. | ............. | 345/174 |
| 5,541,372 A * | 7/1996 | Baller et al. | ............. | 178/18.01 |
| 5,559,512 A * | 9/1996 | Jasinski et al. | ................ | 341/22 |
| 6,515,654 B1 * | 2/2003 | Liao | ........................... | 345/173 |
| 6,671,392 B1 * | 12/2003 | Shigematsu et al. | ......... | 382/124 |
| 6,720,956 B1 * | 4/2004 | Honma et al. | ............... | 345/174 |
| 6,803,905 B1 * | 10/2004 | Capps et al. | ................ | 345/173 |

FOREIGN PATENT DOCUMENTS

EP 1681618 A1 7/2006

\* cited by examiner

*Primary Examiner*—Abbas I Abdulselam
(74) *Attorney, Agent, or Firm*—Mahamedi Paradice Kreisman LLP

(57) ABSTRACT

An electronic device is formed at least partially from a deflectable material that generates an electrical signal in response to contact. The first material is integrated with a display module to provide a shaped feature on the exterior surface of the display module. The shaped feature detects contact with an external object on one or more contact points, where contact with the contact points corresponds to a defined input for a processor of the electronic device.

16 Claims, 7 Drawing Sheets

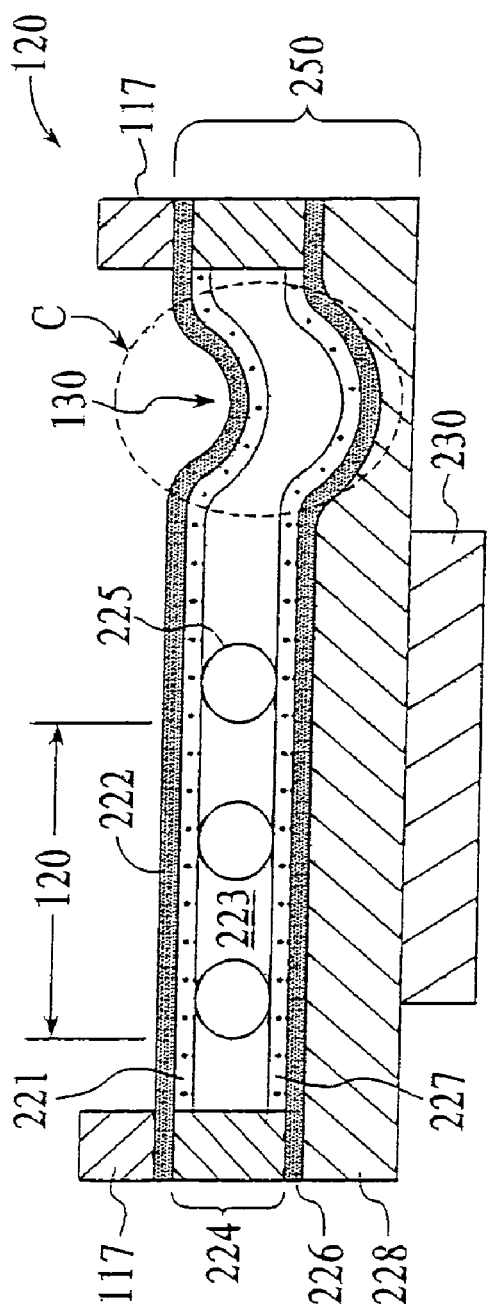
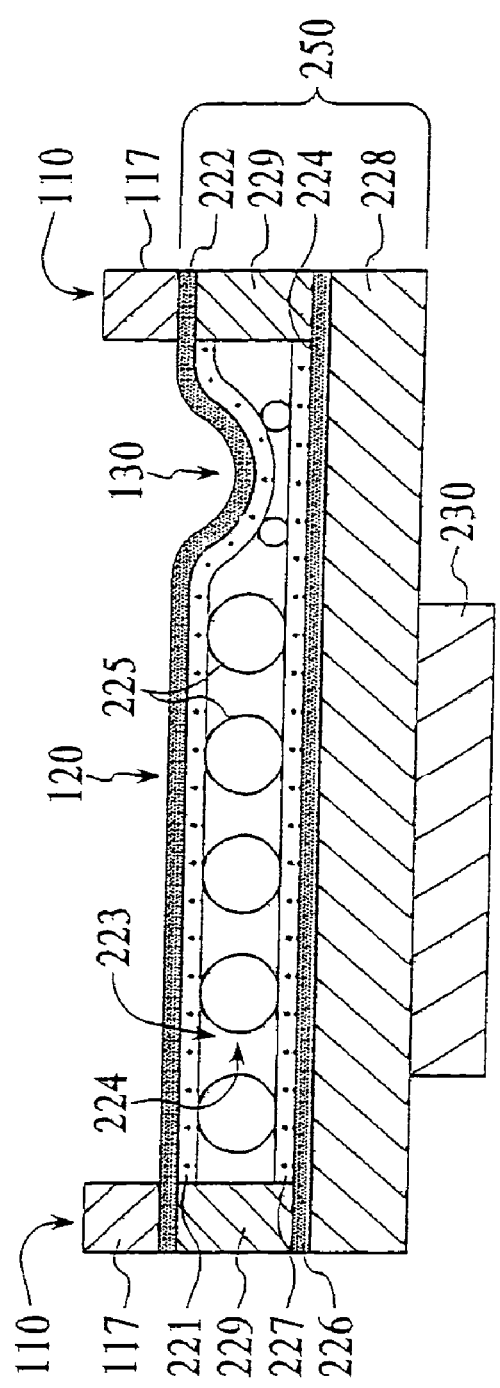
FIG.2A
FIG.2B

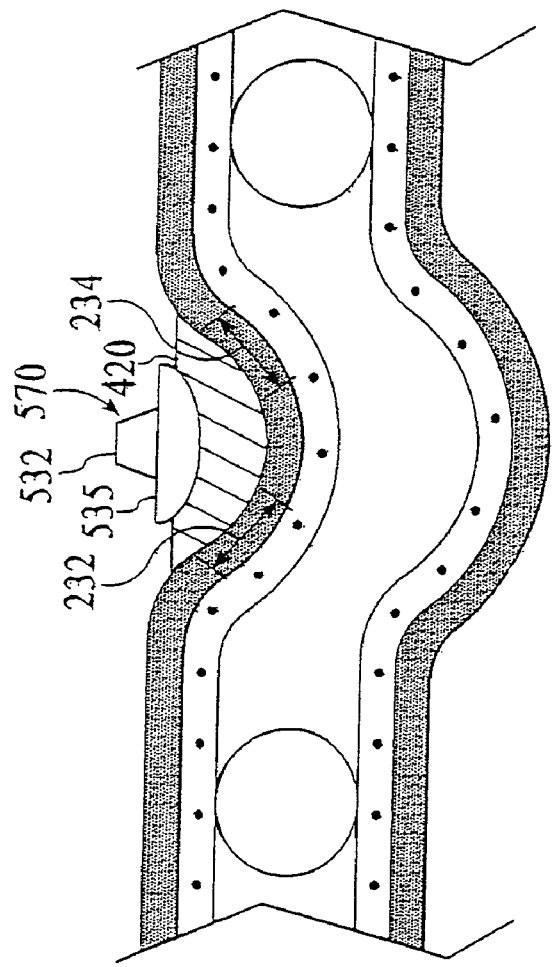
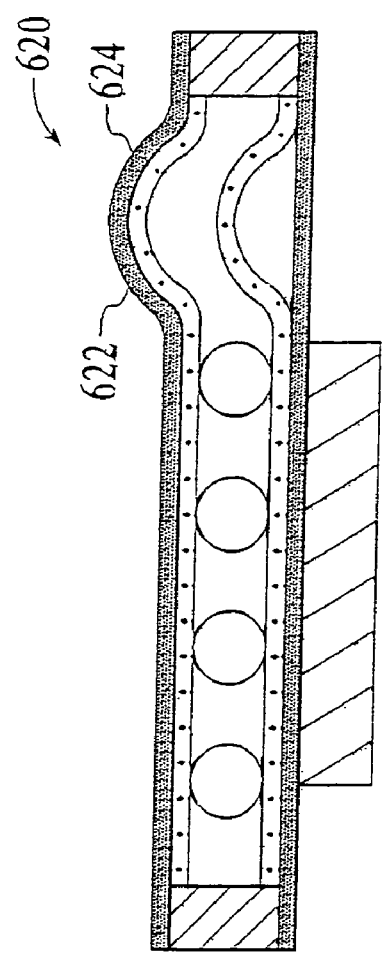
FIG.6
FIG.7

THREE-DIMENSIONAL CONTACT-SENSITIVE FEATURE FOR ELECTRONIC DEVICES

RELATED APPLICATION INFORMATION

This application is a divisional application of U.S. patent application Ser. No. 09/871,322, filed May 30, 2001 now U.S. Pat. No. 6,924,752 entitled, "THREE-DIMENSIONAL CONTACT-SENSITIVE FEATURE FOR ELECTRONIC DEVICES." The aforementioned parent application is hereby incorporated by reference in its entirety.

FIELD OF THE INVENTION

The present invention relates to input mechanisms for electronic devices. In particular, the present invention relates to contact-sensitive input features for electronic devices.

BACKGROUND OF THE INVENTION

Typical input mechanisms for electronic devices and computers include button mechanisms and mechanical actuation switches. These input mechanisms can be subject to failure through repeated use. They require multiple components that can move relative to one another, and may require hinges, springs or joints that are subject to fatigue.

Another type of input mechanism is a digitizer. The digitizer can detect contact on a surface that is typically incorporated with a display. The digitizer may be a component of small computing devices, such as handheld computers, or personal digital assistants (PDAs). An assembly of the digitizer assigns identifying voltage values for different contact points distributed across the digitizer's surface. This allows the user to distinguish a communication by positioning an external object on a specific position of the digitizer.

Inputs such as gestures, taps, and drags are made on the surface of the digitizer through contact. Icons or other visual cues may be employed with the digitizer to give a user an indication that contact with a specific position on the digitizer will cause a processor of the device to perform a specific function. Digitizers are relatively planar, so that contact points on the surface of the digitizer are positions on the same plane. When users enter input through a digitizer, the user selects planar positions on the digitizer's surface for contact with the external object.

FIG. 10 is an illustration of a prior art display module 900. The display module 900 is contact-sensitive to produce electrical signals in response to contact. The electrical signals are subsequently converted to input. The display module 900 includes an exterior layer 910, a conductive layer 920, a substrate 930 and a display 940. The exterior layer 910 is a polyester (PET) film. The conductive layer 920 comprises a first conductive film 922, an air gap 926 formed by spacers 945, and a second conductive film 924. The conductive films 922, 924 are formed of Indium Tin Oxide material, which has a paste constituency. The spacers 945 are formed from glass or plastic. The substrate 930 is also formed from glass or plastic. The layers formed above display 940 provide a digitizer for the device. The combination of layers for the digitizer is clear to enable viewing of an image created by display 940.

Mechanical buttons are sometimes preferred for certain functions because they provide a better tactile feedback for the function being requested by the input. For example, navigation buttons for scrolling a display of a handheld computer are often mechanical buttons, because they provide a better feel of movement being created when scrolling the display.

SUMMARY OF THE INVENTION

An electronic device is provided that has a contact-sensitive, three-dimensional surface feature for receiving input. The surface feature enables users to enter input with a tactile feel for a corresponding function. In addition, the surface feature has fewer mechanically combined components, making it more resilient than other input mechanisms. The user can enter input easier than with more traditional mechanical buttons. Furthermore, embodiments of the invention are operable with fingers as well as a stylus, and may be made to be responsive to grips rather than only distinct touches.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 2A is a cross-sectional view of a length of the electronic device's housing, cut along lines A-A of FIG. 1, under an embodiment of the invention.

FIG. 2B is a cross-sectional view of a length of the electronic device's housing, under another embodiment of the invention.

FIG. 6 is a close-up view of another type of surface feature combination for use with an electronic device, under an embodiment of the invention.

FIG. 7 is a cross-sectional view of a length of the electronic device's housing, the housing including a protruding contact-sensitive surface feature, under another embodiment of the invention.

DETAILED DESCRIPTION OF THE INVENTION

Embodiments of the invention describe three-dimensional contact-sensitive input mechanisms for electronic devices. In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

A. Overview

Embodiments of the invention provide an input mechanism for an electronic device. The input mechanism is a shaped feature combined with a contact-sensitive material. The input mechanism may be integrated with a display module or housing of the electronic device.

Under an embodiment of the invention, an electronic device is formed at least partially from a deflectable material that generates an electrical signal in response to contact. The first material is integrated with a portion of the electronic device to provide a shaped feature on an exterior surface of the housing and/or display module. The shaped feature detects contact with an external object on one or more contact points. The contact points correspond to regions where contact is interpreted as a defined input that is signaled for a processor of the electronic device.

In an embodiment, the deflectable material with the shaped feature may be an integrated or unitary function of a display module for the electronic device. Alternatively, the deflectable material and shaped feature can be included with the housing.

In an embodiment, the contact-sensitive feature may be unitarily formed with a housing of the electronic device. The housing of the electronic device may also be combined with a display module. As used herein, unitarily formed means that the components are combined in a manufacturing process to be one component or item for the end user. The components may be combined on a molecular level in order to be unitarily formed.

B. Electronic Device With Contact-Sensitive Surface Feature

Figure 1:
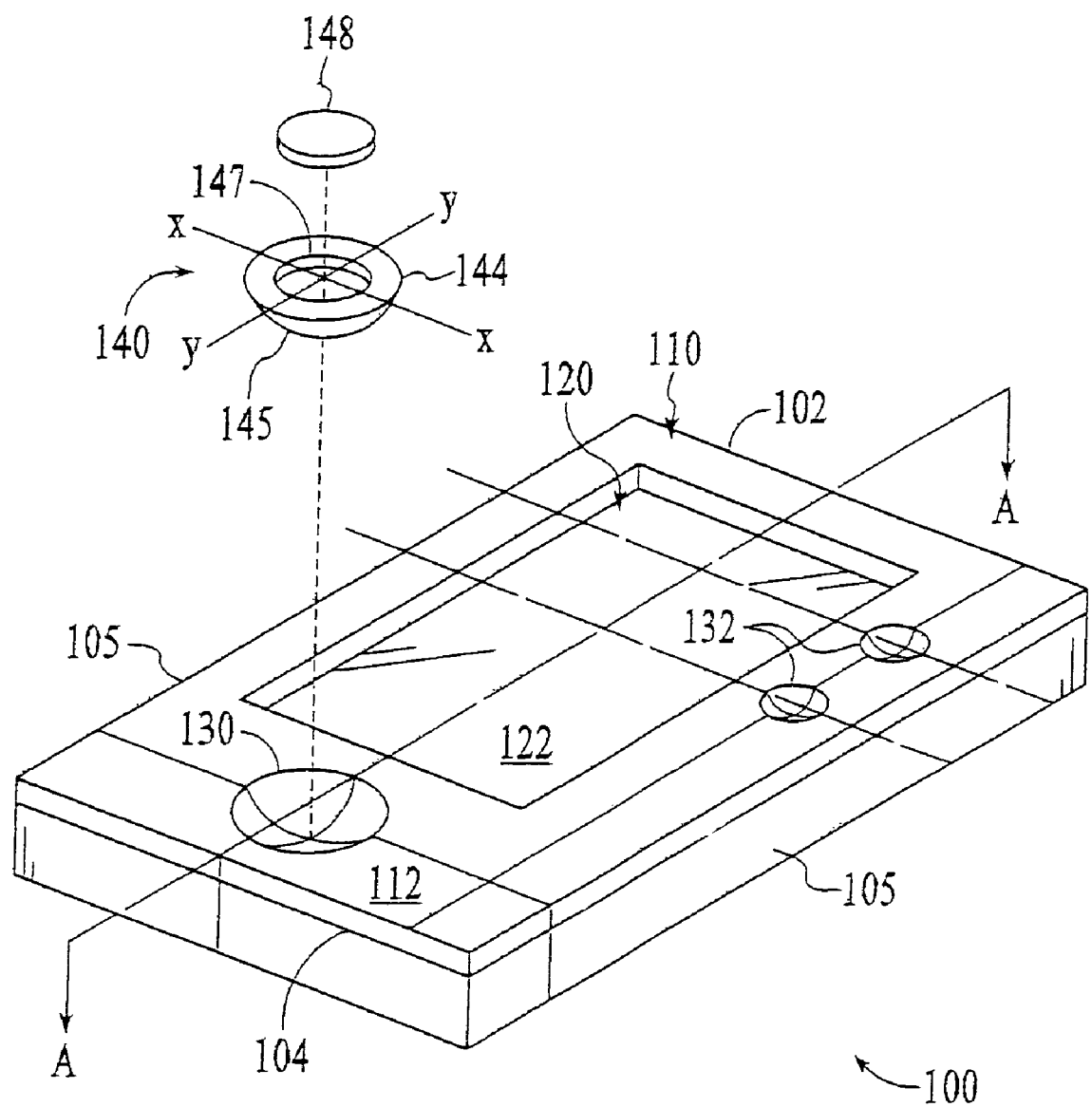
FIG. 1 is an exploded, isometric view of an electronic device including a contact-sensitive surface feature, under an embodiment of the invention.

FIG. 1 illustrates an electronic device 100 equipped with a display module 120, under an embodiment of the invention. The electronic device 100 includes a housing 110 having a front panel 112 to provide a display surface 122 of housing 110. One or more contact-sensitive, three-dimensional features are formed on an exterior surface of the electronic device 100. The front panel 112 extends between a top 102 and a bottom 104, and between opposing lateral sides 105.

In an embodiment, electronic device 100 is a handheld computer, such as a PDA manufactured by Palm Inc, or a device operating a POCKET PC or WINDOWS CE operating system, manufactured by MICROSOFT. In other embodiments, electronic device 100 includes devices such as touch-sensitive computer tablets, laptop computers, mobile phone devices, or any other device containing processing resources.

In an embodiment, housing 110 is formed at least partially from a contact-sensitive material that generates an electrical signal in response to being contacted by an external object. The material is deflectable or otherwise deformable to generate a voltage differential, causing a current to be generated as a signal.

The display module 120 may include components for detecting contacts on display surface 122. As such, display module 120 may be formed from the same contact-sensitive material used with housing 110. Alternatively, display module 120 is formed from a different type of contact sensitive material. Still further, housing 110 may contain display module 120, with contact-sensitive features being provided only on display surface 122.

The electronic device 100 includes a plurality of surface features, provided on front panel 112 and/or display surface 122. The surface features are formed from the contact-sensitive material on the remainder of housing 110. The contact-sensitive material is shaped or molded into a three-dimensional feature provided on a surface of housing 110.

In an embodiment, the surface features include a first recess 130 and a pair of second recesses 132. Each recess 130, 132 is formed to detect a contact from an external object, such as a contact mechanism, stylus, finger or other extension. The recesses 130, 132 can be deflected by contact to generate electrical signals that are received as input by electronic device 100.

In one configuration, first recess 130 is positioned adjacent to display surface 122, between the display surface and a bottom edge 104 of housing 110. Second recesses 132 are shown between display surface 122 and a lateral side 105 of housing 110. Each recess 130, 132 is actuatable through contact to signal a command for a processor. The recesses 130, 132 may be pre-associated with one or more functions that can be performed by the processor.

In an embodiment, second recesses 132 are actuatable as switches. That is, the second recesses 132 may be contacted to cause one signal assertion, similar to the operation of a button. The first recess 130 includes multiple contact points to enable users to create multiple signal assertions from the same relative position. The multiple contact points of recess 130 allow for multiple inputs, where each input is distinguished by the position of the external object contacting the first recess 130. For example, recess 130 may be contacted in a portion proximate to display surface 122 to cause an image appearing on display surface 122 to scroll upwards. Likewise, recess 130 may be contacted in a position distal to display surface 122 to cause an image appearing on display surface 122 to scroll downwards.

FIG. 1 shows that first recess 130 may be coupled to an optional contact mechanism 140 to facilitate entering contacts. The contact mechanism 140 may be coupled to recess 130 during a manufacturing step, or may be configured to be attachable to one or more of the recesses 130, 132 by an end user. In one embodiment, contact mechanism 140 includes a swivel 144 that can be pivoted within first recess 130. The swivel 144 includes an opening 147 for an end piece 148. The end piece 148 fits into opening 147 to provide an exterior contact surface for swivel 144. Swivel 144 includes a bottom portion 145 that rests in recess 130. The bottom portion 145 is contoured or rounded to enable swivel 144 to rock along an axis X and/or Y. In this way, swivel 144 can be pivoted in at least two directions to generate different input signals from recess 130. When pivoted, swivel 144 may be directed into a contact point of recess 130, so as to cause an input signal to be signaled to the processor of electronic device 100.

In another implementation, contact points are provided on recess 130 so that swivel 144 can be directed in eight directions within contact recess 130. Each contact point may correspond to a different input. This allows swivel 144 and end piece 148 to be operated like a multi-directional joystick.

Portions of electronic device 100 are formed from a conductive, contact-sensitive material that is pliable into to different types of surface features. The contact-sensitive material may be integrated with the housing 110 and/or display module 120. A surface feature shaped by the contact-sensitive may be viewed as a portion of display module 120 if the surface feature is formed as an integrated extension of display 120, even if the surface feature is provided on a region of the electronic device that is outside the footprint of display surface 122. The surface feature may alternatively be viewed as a portion of housing 110 if the surface feature is formed on a structure that is distinct from display module 120. Therefore, the surface feature is formed on a region of a layer formed from the contact-sensitive material. The layer of contact-sensitive may overlap a portion of the front panel's footprint.

FIG. 2A is a cross-sectional view of display module 120 of handheld computer 100, cut along lines A-A of FIG. 1, under an embodiment of the invention. The display module 120 includes a digitizer pad 250 to enable the display module to detect contact. An embodiment incorporates a surface feature on a segment of digitizer pad 250. The digitizer pad 250 includes an exterior layer 222, an intermediate conductive section 224, interior layer 226, and substrate 228. The digitizer pad 250 may be incorporated to form a contact-sensitive portion of housing 110, and/or of display module 120. To this end, digitizer pad 250 may be extended over a region that overlaps display module 120 and portions of front panel 112. Opposing sealing elements 229 form a boundary for the conductive portion of digitizer pad 250.

When incorporated with display module 120, digitizer pad 250 extends over a display 230. The display 230 includes pixels or other display elements for creating an image from a processor signal. The layers of display module 120 overlaying display 230 are clear or translucent to enable a user to view the image.

In an embodiment, an exterior layer 222 of the contact-sensitive portion is formed of a PET film. The exterior layer 222 may have a thickness range between 75-180 micrometers. The exterior layer 222 forms a protective barrier for display module 120, while providing display surface 122 as a smooth area for receiving contact by a stylus tip or other instrument. In an embodiment, segments 117 of front panel 112 are provided over regions of digitizer pad 250 where contact-sensitive input is not wanted, corresponding to where sealing elements 229 are located.

The conductive section 224 includes a first conductive layer 221, an air gap 223 and a second conductive layer 227. The first and second conductive layers 221 and 227 are formed of a material having a property of generating an electrical signal when made to contact one another. A plurality of spacers 225 define air gap 223. The first conductive layer 221 may be deflected into air gap 223 to make contact with second conductive layer 227. When first conductive layer 221 is made to contact second conductive layer 227, a signal is generated for the processor of electronic device 100. The signal may be differentiable to indicate a position where the first conductive layer 221 is made to contact the second conductive layer 227.

In an embodiment, the conductive layers 221 and 227 are each formed by a PET layer combined with a conductive paste. The conductive paste is clear or translucent, and can be formed into a three-dimensional shape during a manufacturing process. At least the first conductive layer 221 is deformable to extend across air gap 223 and make contact with second conductive layer 227, resulting in a voltage signal that is later interpreted as processor signals. Opposing sealing components 229 form a boundary for conductive section 224. The spacers 225 may be formed from glass or clear plastic. In one implementation, the conductive paste for conductive layers 221 and 227 is a clear paste commercially available under the trade name ELECTRODAG, manufactured by ACHESON. This material also has the property of being pliable for creating shapes and other features. NISSHA of Japan manufactures a film product for conductive layers 221 and 227, using ELECTRODAG.

A thickness of conductive section 224 for each conductive layer 221 and 227 ranges between 150-220 micrometers, and preferably at about 180-200 micrometers. The thickness for air gap 223 may range between 200-400 micrometers, and corresponds to a diameter of spacers 225.

As an alternative, conductive section 224 may be formed of Indium Tin Oxide. The spacer balls 225 may be distributed within conductive section 224 to create a support structure for a three-dimensional feature.

The interior layer 226 is optional. The interior layer 226 may be formed from a PET material similar to exterior layer 222. The conductive section 224 can generate a differentiable voltage signal for substrate 228 when first conductive layer 221 is made to contact second conductive layer 227. The substrate 228 includes traces and other electronic contacts that signal voltage differentials generated from conductive section 224 to a component such as an analog-digital converter. The AD converter converts the voltage differential signal to a digital format for the processor of the electronic device.

In an embodiment, a footprint of display 230 is smaller than a footprint of the other layers of display module 120. As described with FIG. 1, the conductive section 224 of display module 120 may extend across a majority of front panel 112 (FIG. 1).

The surface feature creates a variable thickness in digitizer pad 250. This may correspond to a region of housing 110 and/or display module 120. When the surface feature is employed on front panel 112 (or other housing surface), the front panel 112 may include impression or shape of variable thickness corresponding to the surface feature. The exterior layer 222 one or more contact points for digitizer 250.

In one embodiment, the layers forming digitizer pad 250 are contoured or shaped with the impression on the exterior surface. FIG. 2A shows that first conductive layer 221, second conductive layer 227, and interior layer 226 may be contoured or indented inward (or outward). The substrate 228 may also be contoured. Therefore, multiple layers of the contact-sensitive portion, including first conductive layer 221 and second conductive layer 227, are contoured to match the shape of recess 130.

FIG. 2B illustrates an embodiment where only the exterior layer 222 and the first conductive layer 221 are contoured to provide recess 130. The second conductive layer 227 is planar with substrate 228. The air gap 223 therefore narrows between the first and second conductive layers 221 and 227. The narrow region of air gap 223 may be used to provide a feature that is more sensitive to contact.

In an embodiment shown by FIGS. 2A and 2B, recess 130 is formed on a portion of display module 120 that extends beyond the footprint of display 230. The recess 130 may be formed to appear as either a portion of housing 110 or as a feature of display module 120.

Figure 2C:
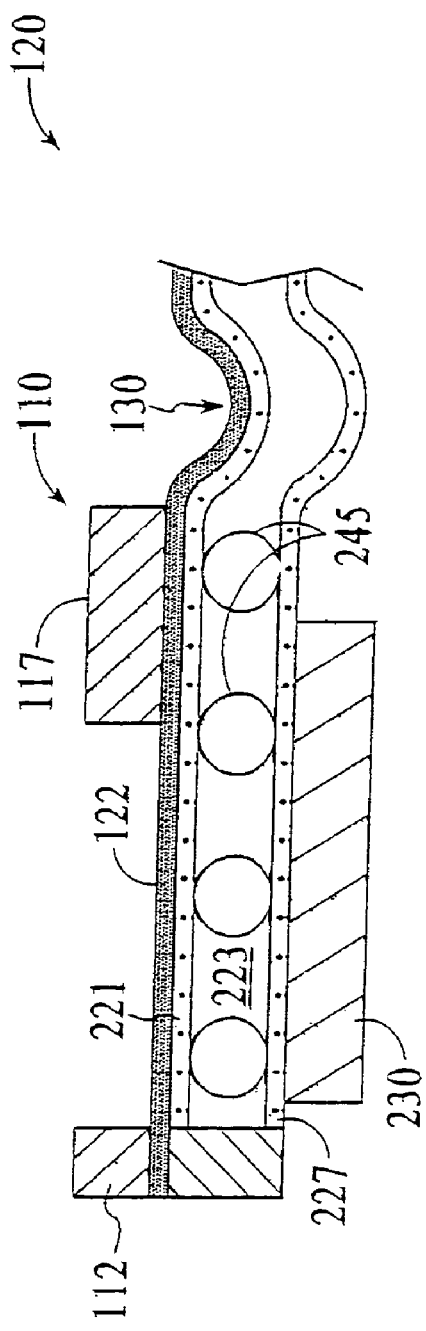
FIG. 2C is a cross-sectional view of a length of the electronic device's housing, under another embodiment of the invention.

FIG. 2C illustrates another configuration where recess 130 is formed on a portion of front panel 112 separated from display surface 122 through surface housing segments 117. In this configuration, recess 130 forms a portion of the housing 110 (FIG. 1) for electronic device 100. A rigid layer such as provided by housing segments 117 precludes first conductive layer 221 from being deformed to make contact with second conductive layer 227.

Alternatively, the front panel 112 may include recess 130 and be isotropic with display module 120, so that the front panel and display surface 122 are relatively seamless. The spacers 245 of air gap 223 may be configured to preclude first conductive layer 221 from contacting second conductive layer 227 in that localized region. Thus, the contact required for entering input through the digitizer portion of the housing may be localized to the region of recess 130.

In another embodiment, recess 130 forms a portion of the display surface 122 (FIG. 1) that is inoperative. Still further, another embodiment may provide that recess 130 is formed onto an active portion of display surface 122, within the footprint of display 230.

C. Configurations and Mechanisms For Contact-Sensitive Surface Feature

Figure 3:
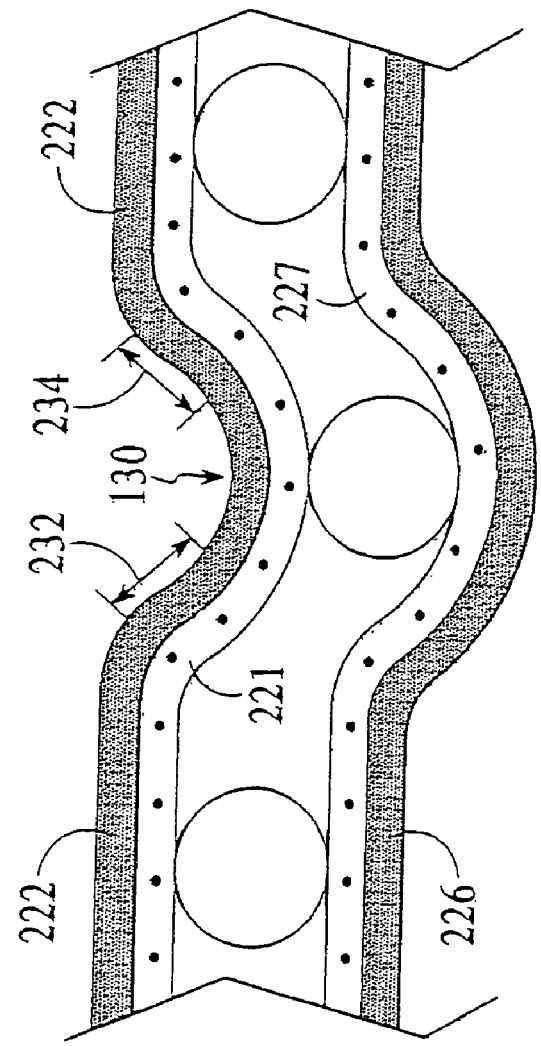
FIG. 3 is a close-up view of a recess shown by line C in FIG. 2A, under an embodiment of the invention.

FIG. 3 is a close-up view of recess 130, under an embodiment of the invention. The recess 130 is shaped to be coupled with contact mechanism 140 (FIG. 1). The exterior layer 222, first conductive layer 221, second conductive layer 227, and interior layer 226 are all contoured to define a shape for recess 130. The substrate 228 (FIGS. 2A and 2B) may also be shaped for recess 130. The first and second conductive layers 221 and 227 are formed from a pliable material that can be shaped to define recess 130, or another feature. One or more contact points may be included on recess 130 to define where first conductive layer 221 may be combined with second conductive layer 227 to signal the processor of the electronic device 100.

According to embodiment, a first contact point 232 is disposed towards bottom 104 of housing 110 (FIG. 1), and a second contact point 234 is disposed towards top 102 of housing 110 (FIG. 1). Each contact point 232, 234 is a region or segment of the shaped feature aligned or otherwise coupled to an electrical lead for detecting a voltage differential generated in that region from contact. Additional contact points may be similarly provided on recess 130. The swivel 144 of contact mechanism 140 pivots within recess 130 to make contact with contact points 232 and 234. Alternatively, other external objects such as stylus tips and fingers may be used to make contact with contact points 232 and 234.

Figure 4:
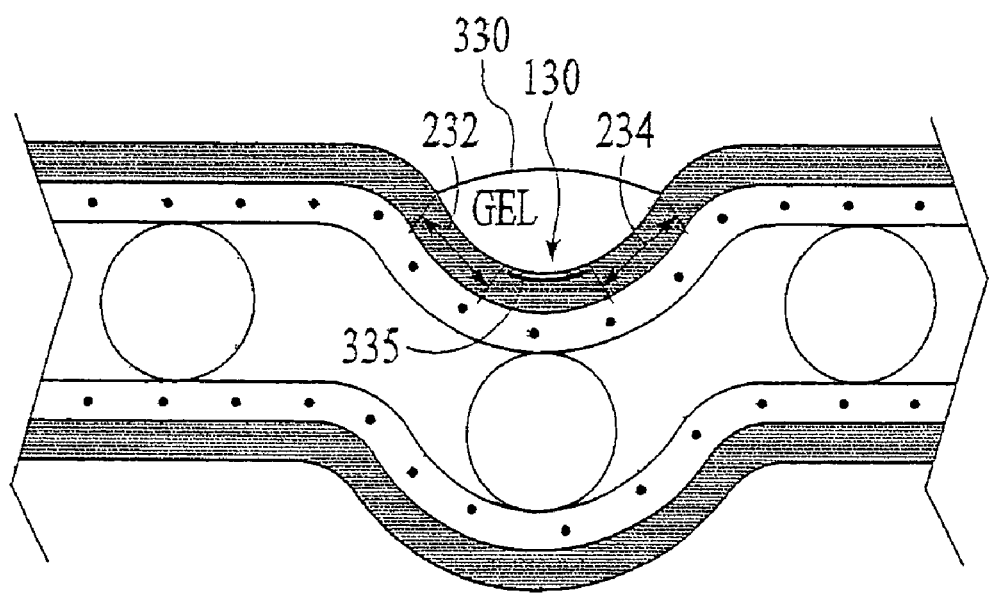
FIG. 4 is a close-up view of another type of surface feature combination for use with an electronic device, under an embodiment of the invention.

FIG. 4 illustrates another embodiment where a gel cap 330 is positioned within recess 130 to facilitate a user in actuating the contact points 232, 234. The gel cap 330 is fixed to recess 130 at bottom position 335. Adhesives or other fasteners may be used to fix gel cap 330. The mass within gel cap 330 can be moved within recess 130 through contact. When moved, the shape of gel cap 330 can be deformed to apply sufficient pressure for effectuating a contact with contact points 232 and 234. Examples of materials that may be used for gel cap 330 include elastomers and foam.

Among advantages provided by gel cap 330, users can more readily use fingers to actuate contact points 232 and 234. The gel cap 330 has a tactile feedback that allows users to make incremental adjustments to the position of the gel cap's mass within recess 130. The gel cap 330 can be gripped with a sustained contact and moved to contact points 232, 234 as desired. Furthermore, the motion required by the user is lateral, to enable contact points 232 and 234 of recess 130 to be actuated when, for example, the user's arm is extended while placing a thumb on the gel cap 330 to enter input.

Figure 5:
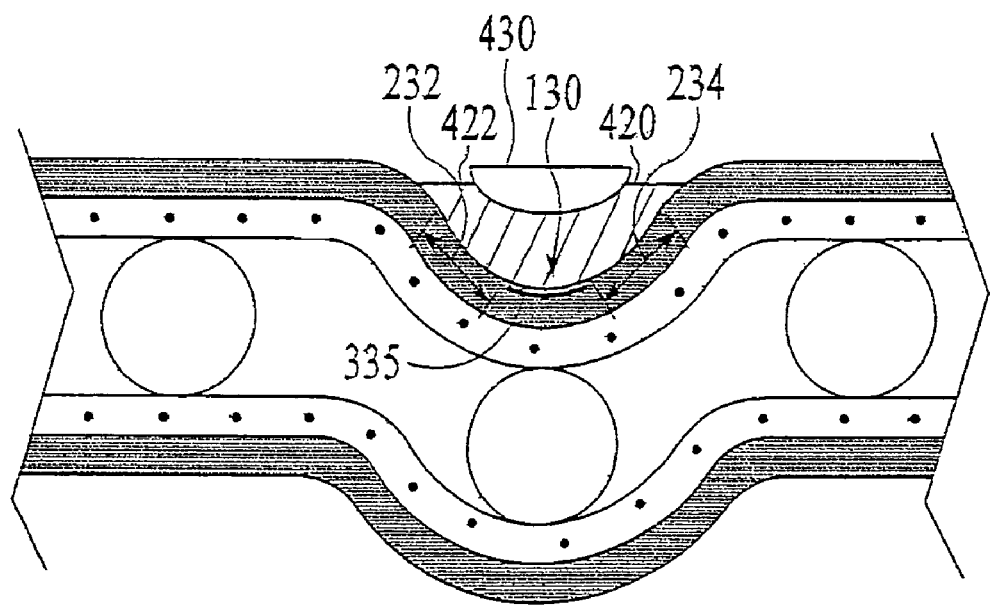
FIG. 5 is a close-up view of another type of surface feature combination for use with an electronic device, under an embodiment of the invention.

FIG. 5 illustrates a gel filler 420 combined with a moveable surface 430 on recess 130. The gel filler 420 is formed from a sealed gelled mass that is fixed to recess 130 at bottom position 335. The moveable surface 430 is mounted over the gel filler 420. The moveable surface 430 may be fixed to an exterior surface 422 of gel filler 420. The mass of the gel filler 420 may be moved within recess 130 when moveable surface 430 is directed in one direction or another. The moveable surface 430 is moved to displace the interior mass of gel filler 420, so as to apply pressure or cause contact for actuating contact points 232 and 234.

FIG. 6 illustrates a moveable surface 530 mounted over gel filler 420, under another embodiment of the invention. The moveable surface 530 includes an extension 532 extending from a base 535. The extension 532 facilitates finger contact by a user to displace mass within gel fill 420, so as to enable base 535 to make contact with contact points 232 and 234.

FIG. 7 illustrates another embodiment illustrating a contact-sensitive surface feature shaped as a protrusion 620. The protrusion 620 may include multiple contact points 622, 624. The contact points 622, 624 may be positioned to indicate a function to the user. For example, first contact point 622 may direct the contact towards the display surface 122 (FIG. 1) of electronic device 100 to indicate an upward navigation or scroll for the display surface 122. Likewise, a second contact point 624 may direct away from display surface 122 to indicate navigation or scrolling in an opposite direction.

Shapes other than recesses and protrusions illustrated by FIGS. 1-7 are under different embodiments of the invention. The conductive section 224 may be formed into a variety of shapes to create an input mechanism that facilitates use of electronic device 100.

D. Other Embodiments

Figure 8:
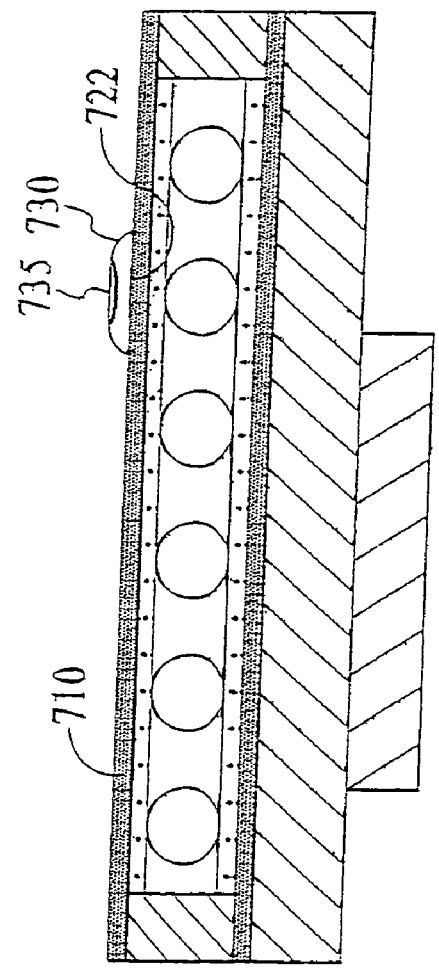
FIG. 8 is a cross-sectional view of a length of the electronic device's housing, the housing including a surface mounted feature for entering input, under another embodiment of the invention.
Figure 10:
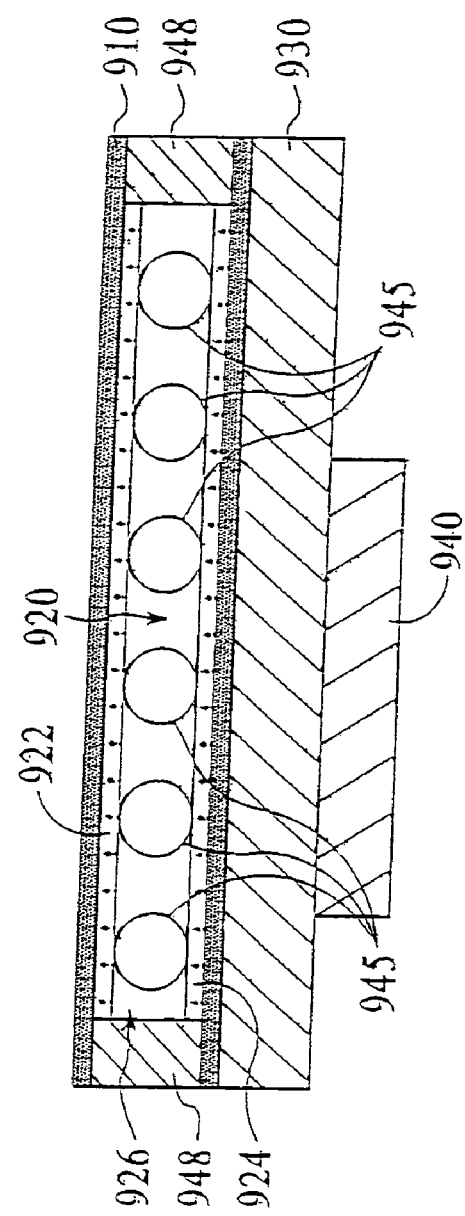
FIG. 10 is a prior art illustration of a display module including a digitizer.

While other embodiments described herein provide for a shaped contact-sensitive feature, another embodiment may incorporate three-dimensional contact-sensitive effect on a surface of the housing 110 for the electronic device 100. FIG. 8 is a cross-sectional view illustrating a surface mounted gel volume 730 on display surface 722, formed as an exterior to a first layer 710. The first layer 710 is substantially planar, and forms a portion of a contact-sensitive display module 720. The gel volume 730 may be fixed to the surface of front panel 112. A moveable component 735 is mounted over the gel volume 730. The moveable component 735 can be directed to displace the interior mass of gel volume 730 so as to cause contact with one or more contact points 722 on the underside of the gel volume 730. For example, the combination of moveable component 735 on gel volume 730 can be operated similar to a button if moveable component 725 is directed towards surface 710.

Alternatively, the combination of the moveable component 735 and gel volume 730 can be operated as a navigation or swivel input mechanism. This may be accomplished by distributing a plurality of contact points on surface 710 in position to be contacted or pressed by movement of moveable component 735.

Structures similar to input mechanisms such as described with recesses 130 and 132 (FIG. 1) may alternatively be employed as sensor mechanisms. In one embodiment, housing 110 (FIG. 1) may be lined with a layer formed from contact-sensitive material, such as ELECTRODAG. At certain regions on housing 110, the contact-sensitive lining may be made to act as sensors that detect contact by a user's hand. The electronic device 100 may be configured based on the sensors detecting the hand or other component. As an example, sensors on a backside of housing 110 may detect whether a user is employing a left hand or right hand to hold the electronic device. The operations of the electronic device 100 may then be configured for left-handed or right-handed users, as detected by the sensors.

E. Hardware Components

Figure 9:
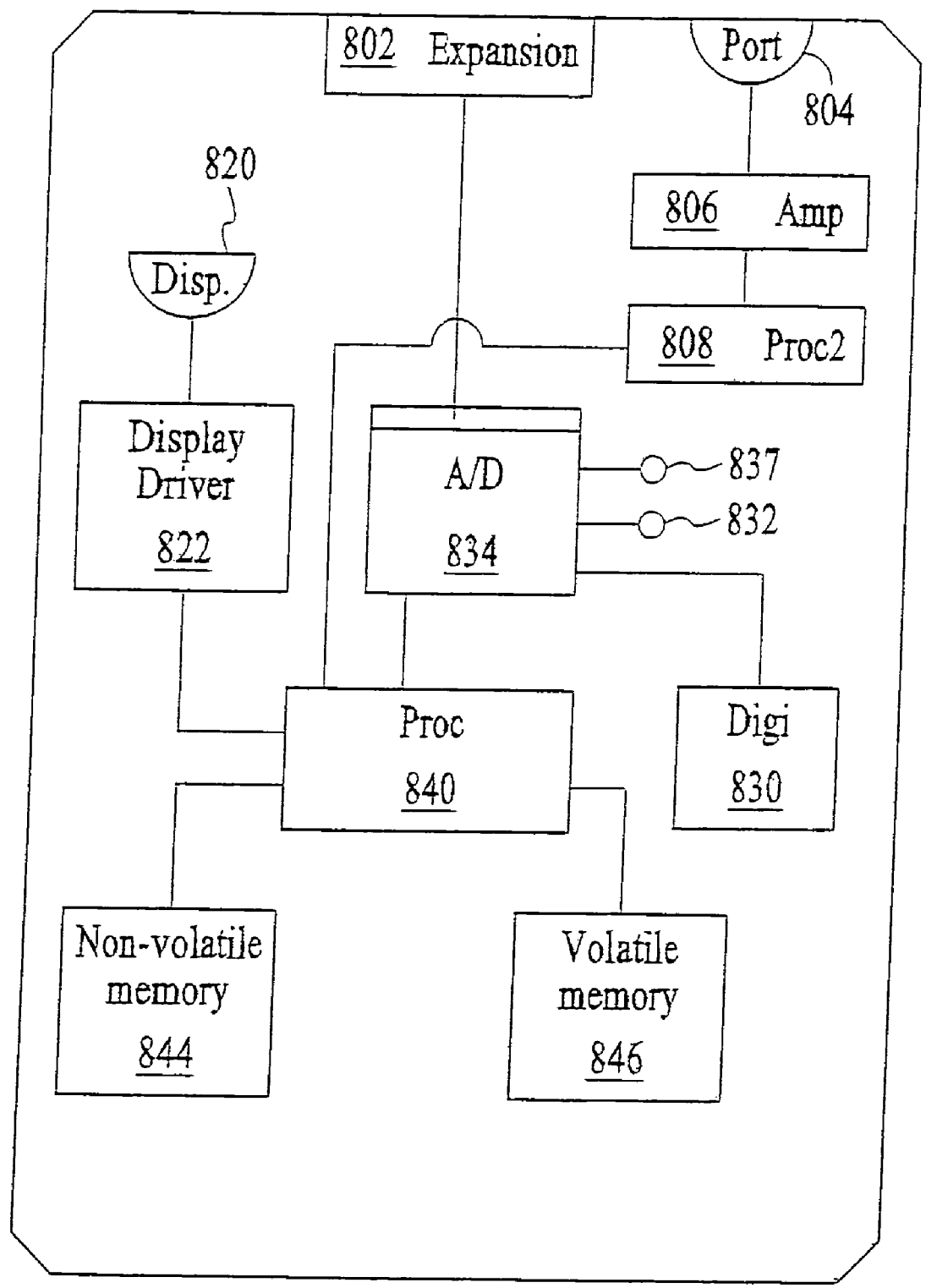
FIG. 9 is a hardware diagram of an electronic device, under an embodiment of the invention.

FIG. 9 is a block diagram of electronic device 100, including components for receiving input from the contact-sensitive surface or feature shown with FIGS. 1-8. According to an embodiment, electronic device 100 includes a processor 840 coupled to a first memory 844 and a second memory 846. The processor 840 is coupled to a display driver 822. The processor 840 combines with display driver 822 to process and signal data for presentation on a module display 820. A digitizer 830 is coupled to processor 840 via an analog-digital (AD) converter 832. The AD converter 832 is coupled to substrate 228 (FIG. 2) to receive voltage differential signals generated through deflection of conductive section 224 (FIG.

2). In an embodiment, AD converter 832 includes first channel 833 and second channel 837 to receive voltage differential signals and generate a corresponding digital signal for processor 840.

The electronic device 100 may include one or more expansion slots. In an embodiment shown, a first peripheral port 802 enables one or more types of accessory devices to be connected to processor 840. In addition, electronic device 100 may include a wireless peripheral port 804 that enables information to be communicated to processor 840 from an external source. The wireless peripheral port 804 forwards incoming communications to an amplifier 806 for processor 840. A second processor 808 intercepts communications incoming to and/or outgoing from wireless peripheral port 804 for purpose of facilitating conversion of data signals between formats and protocols of wireless communications, and those that can be processed by processor 840.

The display module 820 cooperates with display driver 822 to display images on display surface 822. The first memory 844 may be non-volatile. The processor 840 combines with display driver 822 to present the data in a paginated format on display module 820.

F. CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic device comprising:
   one or more processors;
   a housing containing the one or more processors;
   a display surface provided on the housing;
   a three-dimensional feature that includes a recess formed into a surface of the housing that is outside of a footprint of the display surface, so as to be part of the housing and not part of the display surface;
   wherein the feature integrates the recess with one or more sensors so that the recess is contact-sensitive and operable with contact to signal a corresponding input to the one or more processors.

2. The electronic device of claim 1, further comprising an analog-digital converter to receive the input from the feature in an analog format, and to signal the input to the one or more processors in a digital format.

3. The electronic device of claim 1, wherein the three-dimensional contact-sensitive feature is positioned adjacent to the display surface.

4. The electronic device of claim 3, wherein the one or more sensors include a material that is integrated into the recess.

5. The electronic device of claim 1, wherein the recess of the three-dimensional contact-sensitive feature includes two or more contact points, wherein the one or more sensors are configured to detect one of touch or object contact at each of the contact points of the recess.

6. The electronic device of claim 1, wherein the three-dimensional contact-sensitive feature is sensitive to contact from a finger or object that exceeds a threshold.

7. An electronic device comprising:
   a processor;
   a display assembly;
   a housing containing the processor, the housing including a front panel on which a display surface of the display assembly is provided;
   an external layer that is provided as part of at least a portion of the panel and which extends over the display surface and at least some of a surrounding portion of the front panel, so that a region of the front panel that includes the display surface and the surrounding portion is smooth; and
   a surface feature corresponding to a recess that is integrally formed on the front panel to receive contact from a user as input, the surface feature being provided outside of a footprint of the display surface, the surface feature including a plurality of contact regions, so that the processor interprets touch by a user at each of the plurality of contact regions as input;
   wherein the surface feature is shaped so that a thickness of the front panel at a region of the surface feature is different than the thickness of the front panel that includes the display surface and the surrounding portion.

8. The electronic device of claim 7, wherein the external layer includes a polyester film.

9. The electronic device of claim 7, wherein the surface feature includes one or more sensors to detect touch by the user.

10. A wireless communication device comprising:
    one or more processors, including processing resources for receiving and transmitting wireless communications of a particular format and/or protocol;
    a display assembly;
    a housing containing the one or more processors, the housing including a front panel on which a display surface of the display assembly is provided;
    a three-dimensional contact-sensitive recess that is (i) provided to receive contact from a user as input on a surface of the housing and, (ii) is outside of a footprint of the display surface, so as to be part of the housing and not part of the display surface;
    wherein the recess is operable by a user to signal one or more inputs for the one or more processors.

11. An electronic device comprising:
    one or more processors;
    a housing containing the one or more processors;
    a display surface provided on the housing;
    a three-dimensional structural feature that includes a protrusion formed on a surface of the housing that is outside of a footprint of the display surface, so as to be part of the housing and not part of the display surface;
    wherein the feature integrates the protrusion with one or more sensors so that the protrusion is contact-sensitive and operable with contact to signal a corresponding input to the one or more processors.

12. The electronic device of claim 11, further comprising an analog-digital converter to receive the input from the feature in an analog format, and to signal the input to the one or more processors in a digital format.

13. The electronic device of claim 11, wherein the protrusion is positioned on the surface of the front panel adjacent to the display surface.

14. The electronic device of claim 13, wherein the one or more sensors include a material that is integrated into the protrusion.

15. The electronic device of claim 11, wherein the protrusion e includes two or more contact points, wherein the one or more sensors are configured to detect one of touch or object contact at each of the contact points.

16. The electronic device of claim 11, wherein the three-dimensional contact-sensitive feature is sensitive to contact by a finger or object that exceeds a threshold.

* * * * *